(12) United States Patent
Kwon et al.

(10) Patent No.: US 12,141,811 B2
(45) Date of Patent: Nov. 12, 2024

(54) APPARATUS AND METHOD FOR PROVIDING SERVICE

(71) Applicant: LG Electronics Inc., Seoul (KR)

(72) Inventors: Yong-Hoan Kwon, Seoul (KR);
Suhwan Lee, Seoul (KR); Ill Shin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 17/232,752

(22) Filed: Apr. 16, 2021

(65) Prior Publication Data

US 2021/0326898 A1 Oct. 21, 2021

(30) Foreign Application Priority Data

Apr. 17, 2020 (KR) .................. 10-2020-0046803

(51) Int. Cl.
*G06Q 30/016* (2023.01)
*G06Q 10/20* (2023.01)
*H04W 84/12* (2009.01)

(52) U.S. Cl.
CPC .......... *G06Q 30/016* (2013.01); *G06Q 10/20* (2013.01); *H04W 84/12* (2013.01)

(58) Field of Classification Search
CPC ...... G06Q 30/016; G06Q 10/20; G06Q 50/10; H04W 84/12
See application file for complete search history.

(56) References Cited

U.S. PATENT DOCUMENTS 7,181,620 B1\* 2/2007 Hur ................ H04L 63/0869 713/168
10,217,068 B1\* 2/2019 Davis .................. G07F 9/026
10,579,971 B1\* 3/2020 Davis .................. G06Q 10/1097
2001/0042125 A1\* 11/2001 Watanabe .............. G06Q 20/12 709/227
2002/0029575 A1\* 3/2002 Okamoto ............ H04L 12/2803 236/94

(Continued)

FOREIGN PATENT DOCUMENTS

EP 3547236 10/2019
KR 102017087 10/2019

OTHER PUBLICATIONS

S. Karpischek, F. Michahelles, F. Resatsch and E. Fleisch, "Mobile Sales Assistant—An NFC-Based Product Information System for Retailers," 2009 First International Workshop on Near Field Communication, 2009, pp. 20-23, doi: 10.1109/NFC.2009.18. (Year: 2009).\*

(Continued)

*Primary Examiner* — John S. Wasaff
(74) *Attorney, Agent, or Firm* — Fish & Richardson P.C.

(57) ABSTRACT

A service providing apparatus includes: a communicator configured to communicate with an electronic product, a user terminal, and a manufacturing server. The service providing apparatus further includes a controller that is configured to generate data to be transmitted to a service provider to enable the service provider to perform a service on the electronic product, where the data is generated based on product identification information that is associated with the electronic product and that is determined based on communicator identification information of the electronic product received from the user terminal through the communicator.

19 Claims, 4 Drawing Sheets

(56) References Cited

U.S. PATENT DOCUMENTS

| | | | | |
|---|---|---|---|---|
| 2002/0132618 | A1* | 9/2002 | Uchino | H04M 11/007 455/418 |
| 2003/0149573 | A1* | 8/2003 | Lynton | G06Q 30/06 705/302 |
| 2005/0030929 | A1* | 2/2005 | Swier, Jr. | H04W 24/00 370/341 |
| 2009/0235354 | A1* | 9/2009 | Gray | H04L 63/1416 709/224 |
| 2012/0226619 | A1* | 9/2012 | Ryoo | G06Q 10/20 714/3 |
| 2013/0048721 | A1* | 2/2013 | Rasband | G06F 16/9554 235/383 |
| 2014/0028449 | A1* | 1/2014 | Sigal | G08C 17/02 340/12.5 |
| 2014/0070951 | A1* | 3/2014 | Shim | F25B 49/005 340/585 |
| 2014/0087660 | A1* | 3/2014 | Kim | H04B 5/0025 455/41.1 |
| 2015/0074179 | A1* | 3/2015 | Graw | H04L 43/04 709/203 |
| 2015/0304112 | A1* | 10/2015 | Langman | H04L 63/126 713/179 |
| 2016/0073259 | A1* | 3/2016 | Lee | G06F 3/04847 709/225 |
| 2016/0092848 | A1* | 3/2016 | Nakajima | G06Q 30/0283 705/305 |
| 2016/0316317 | A1* | 10/2016 | Mayiras | H04W 52/283 |
| 2017/0176296 | A1* | 6/2017 | Gary, Jr. | G06Q 10/06 |
| 2017/0276426 | A1* | 9/2017 | Jung | F25D 29/00 |
| 2019/0069334 | A1* | 2/2019 | Windorfer | A47L 9/2857 |
| 2019/0324078 | A1* | 10/2019 | Chen | G01R 31/2825 |
| 2019/0332774 | A1* | 10/2019 | Nix | H04W 12/50 |
| 2020/0110651 | A1* | 4/2020 | Milman | G06F 11/2263 |
| 2020/0162262 | A1* | 5/2020 | Shekh-Yusef | H04L 63/107 |
| 2021/0051197 | A1* | 2/2021 | Carpenter | H04L 67/12 |
| 2022/0284257 | A1* | 9/2022 | Meaux | H04W 4/80 |

OTHER PUBLICATIONS

Darianian, M., & Michael, M. P. (Dec. 2008). Smart home mobile RFID-based Internet-of-Things systems and services. In 2008 International conference on advanced computer theory and engineering (pp. 116-120). IEEE. (Year: 2008).*

Qayyum, F. A., Naeem, M., Khwaja, A. S., Anpalagan, A., Guan, L., & Venkatesh, B. (2015). Appliance scheduling optimization in smart home networks. IEEE access, 3, 2176-2190. (Year: 2015).*

Oyekunle, A. T. (2008). Wireless Short Range Communication Technologies for Home Automation. (Year: 2008).*

Extended European Search Report in European Appln. No. 21168899.9, dated Sep. 17, 2021, 11 pages.

Office Action in European Appln. No. 21168899.9, mailed on Feb. 13, 2024, 7 pages.

* cited by examiner

APPARATUS AND METHOD FOR PROVIDING SERVICE

CROSS-REFERENCE TO RELATED APPLICATION

This application claims the benefit of earlier filing date and the right of priority to Korean Patent Application No. 10-2020-0046803, filed on Apr. 17, 2020, in the Korean Intellectual Property Office, which is incorporated herein by reference in its entirety.

TECHNICAL FIELD

The present disclosure relates to after-sales services for an electronic product.

BACKGROUND

Electronic products are used in different environments, and dispositions of users who use the electronic products vary. In fact, user dispositions greatly affect quality and the like of the electronic products in use. Additionally, consumables need to be replaced with replacements at the right time to ensure performance of the electronic products at a certain level or to prevent significant damage to the electronic products. Accordingly, it is important to solve a problem with an electronic product after manufacturing or to smoothly provide after-sales services such as a service provided to replace consumables at the right time to ensure competitiveness of the electronic product.

A conventional device allows an electronic product to continue transmitting a state of the electronic product to a service server and allows the service server to determine whether the electronic product is in a normal state or an abnormal state based on received state of the electronic product.

However, the server may have difficulties in acquiring a model name or similar information associated with an electronic product accurately. Accordingly, accurate and sufficient after-sales services provided through the service server cannot be ensured.

SUMMARY

The present disclosure is directed to an apparatus and/or a method that may allow of provision of various after-sales services with more accuracy.

The apparatus and/or the method may allow of acquisition of identification information of an electronic product possessed by a user in a simple process.

The apparatus and/or the method may allow of confirmation of quality of an electronic product more easily and accurately.

The apparatus and/or the method may allow of provision of after-sales services properly depending on a region where an electronic product is used and/or a user of an electronic product.

According to one aspect of the subject matter described in this application, a service providing apparatus includes a communicator configured to communicate with an electronic product, a user terminal, and a manufacturing server, and a controller configured to generate data to be transmitted to a service provider to enable the service provider to perform a service on the electronic product, where the data is generated based on product identification information that is associated with the electronic product and that is determined based on communicator identification information of the electronic product received from the user terminal through the communicator.

Implementations according to this aspect can include one or more of the following features. For example, the electronic product can comprise a WI-FI communication device, and the communicator identification information can comprise a media access control (MAC) address of the WI-FI communication device.

In some implementations, the controller can be configured to receive, from the user terminal through the communicator, the communicator identification information, and receive, from the manufacturing server, the product identification information corresponding to the communicator identification information. In some examples, the controller can be configured to receive, from the manufacturing server through the communicator, a manufacturing history of the electronic product corresponding to the communicator identification information.

In some implementations, the controller can be configured to receive product state information from the electronic product through the communicator, and analyze the product state information to determine a state of the electronic product. In some examples, the controller can be configured to transmit, to the user terminal through the communicator, the state of the electronic product.

In some examples, the controller can be configured to determine a type of service based on the state of the electronic product, and transmit information regarding the service to the user terminal through the communicator. In some examples, the controller can be configured to transmit the state and the product identification information of the electronic product to a terminal of the service provider to perform the service on the electronic product through the communicator.

According to another aspect of the subject matter described in this application, a service providing method includes receiving, from a user terminal, communicator identification information of an electronic product, and generating data to be transmitted to a service provider to enable the service provider to perform a service on the electronic product, where the data is generated based on product identification information that is associated with the electronic product and that is determined based on the received communicator identification information of the electronic product.

Implementations according to this aspect can include one or more following features. For example, the communicator identification information can comprise a media access control (MAC) address of a WI-FI communication device of the electronic product.

In some implementations, the service providing method can further include receiving, from the user terminal, the communicator identification information, and receiving, from a manufacturing server, the product identification information corresponding to the communicator identification information. In some examples, the service providing method can further include receiving, from the manufacturing server, a manufacturing history of the electronic product corresponding to the communicator identification information.

In some implementations, the service providing method can further include receiving product state information from the electronic product, and determining a state of the electronic product based on the product state information. In some examples, the service providing method can further include transmitting the state of the electronic product to the user terminal.

In some examples, the service providing method can further include determining a type of service based on the state of the electronic product, and transmitting information regarding the service to the user terminal. In some examples, the service providing method can further include transmitting the state and the product identification information of the electronic product to a terminal of the service provider to perform the service on the electronic product.

According to another aspect of the subject matter described in this application, a service providing system includes an electronic product, a user terminal associated with a user of the electronic product, a manufacturing server storing information associated with one or more electronic products, and a service providing apparatus. The service providing apparatus can include a communicator configured to communicate with the electronic product, the user terminal, and the manufacturing server, and a controller configured to generate data to be transmitted to a service provider to enable the service provider to perform a service on the electronic product, where the data is generated based on product identification information that is associated with the electronic product and that is determined based on communicator identification information of the electronic product received from the user terminal through the communicator.

Implementations according to this aspect can include one or more following features. For example, the electronic product can comprise a WI-FI communication device, and the communicator identification information can comprise a media access control (MAC) address of the WI-FI communication device.

In some implementations, the controller can be configured to receive, from the user terminal through the communicator, the communicator identification information, and receive, from the manufacturing server, the product identification information corresponding to the communicator identification information. In some examples, the controller can be configured to receive, from the manufacturing server through the communicator, a manufacturing history of the electronic product corresponding to the communicator identification information.

DETAILED DESCRIPTION

Figure 1:
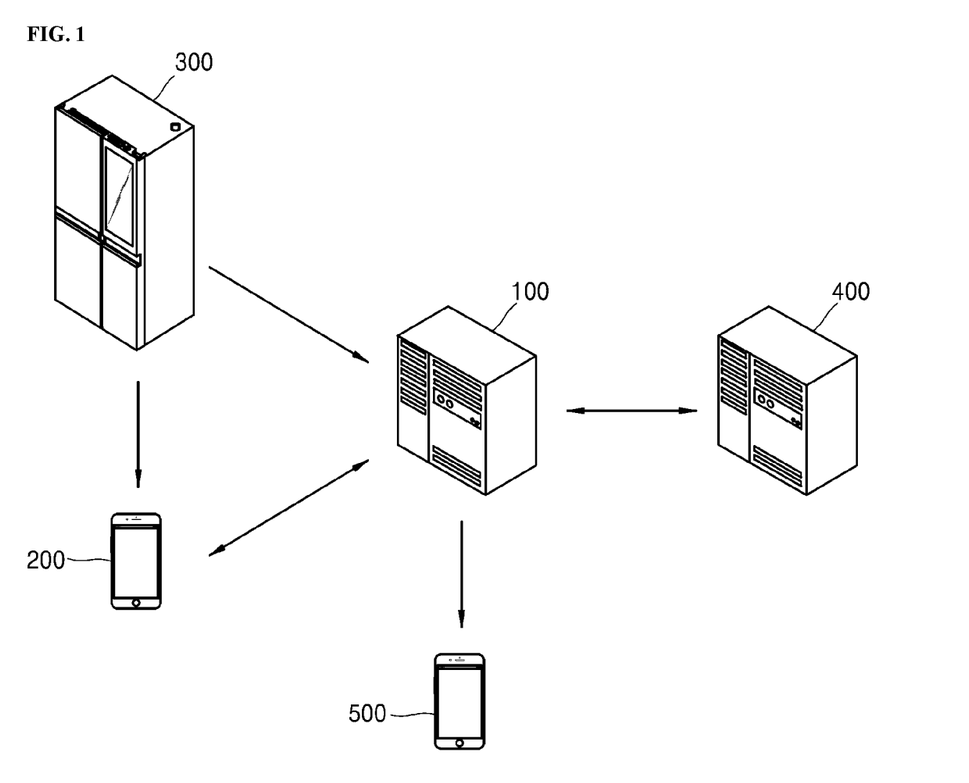
FIG. 1 is a diagram illustrating a schematic view of a service providing system including a service providing apparatus.

FIG. 1 is a diagram illustrating a schematic view of a service providing system including a service providing apparatus. The service providing system can include a service providing apparatus 100, a user terminal 200, an electronic product 300, a manufacturing server 400, and a repairer terminal 500.

The service providing apparatus 100 can include a server configured to provide after-sales services (customer services) in relation to the electronic product 300.

The service providing apparatus 100 can receive communicator identification information, which is identification information of a communication device included in the electronic product 300, and user identification information, from the user terminal 200. The user identification information can be identification information (e.g., a phone number or the like) allocated to the user terminal 200, or identification information (e.g., a user ID or the like) allocated to a user associated with the user terminal 200.

The service providing apparatus 100 can provide, to the user terminal 200, product identification information, which is identification information of an electronic product, corresponding to the communicator identification information received from the user terminal 200. The service providing apparatus 100 can also receive the product identification information together with the identification information of the user terminal 200 from the user terminal 200. The product identification information can include at least one of a model name of the electronic product 300 or a serial number of the electronic product 300.

The service providing apparatus 100 can transmit analysis results, produced as a result of analysis of a state of the electronic product 300, to the user terminal 200. In some implementations, the service providing apparatus 100 can receive an agreement or a disagreement on providing a service to the electronic product 300 from the user terminal 200.

The service providing apparatus 100 can receive, from the manufacturing server 400, the communicator identification information and the product identification information that correspond to each other. In some implementations, the service providing apparatus 100 can receive, from the manufacturing server 400, a manufacturing history of an electronic product corresponding to the communicator identification information. The manufacturing history of an electronic product can include at least one of a manufacturing date, a manufacturing location, a manufacturing line, or information associated with a manufacturing process of the electronic product.

The service providing apparatus 100 can transmit information regarding a service to the repairer terminal 500. The information regarding a service can include at least one of user identification information, a repair date, a location, or details of a repair. The details of a repair can include product identification information or information regarding a part needed for a repair.

The user terminal 200 can include a mobile terminal such as a smartphone or any similar devices. The user terminal 200 can obtain communicator identification information, which is included in an electronic product 300 and is identification information of a communication device, as from communication with the electronic product 300, and can transmit the obtained communicator identification information to the service providing apparatus 100.

The user terminal 200 and the electronic product 300 can receive and transmit data using various communication methods. For example, the user terminal 200 and the electronic product 300 can receive and transmit data using WI-FI or NFC, or any other similar communication methods.

The electronic product 300 can transmit communicator identification information to the user terminal 200. In some implementations, the electronic product 300 can transmit product state information, which is information regarding a state of an electronic product 300, together with the communicator identification information to the service providing apparatus 100. The electronic product 300 can connect to an access point near the electronic product 300 using WI-FI or any similar communication devices, and transmit the communicator identification information and the product state information to the service providing apparatus 100 through the access point.

The manufacturing server 400 can match and store communicator identification information, which is identification information of a communication device included in an electronic product 300, and product identification information and/or a manufacturing history of the electronic product 300, and can provide the stored information to the service providing apparatus 100, during the electronic product 300 is in production.

The electronic product 300 can be manufactured by putting a plurality of assemblies together. The assembly can denote a unit part that is configured as a result of combination of a plurality of components. In some implementations, a sticker can be attached onto an outside of an assembly including a communication device for recognizing communicator identification information. For example, a sticker, on which a QR code or a barcode is displayed, can be attached onto the outside of the assembly. During a manufacturing process, the manufacturing server 400 can obtain communicator identification information of a corresponding electronic product by reading a QR code or a barcode displayed on the sticker. In some implementations, the manufacturing server 400 can obtain product identification information of an electronic product 300 by reading a QR code or a barcode of a sticker attached onto the electronic product 300.

The repairer terminal 500 (i.e., a terminal of a repairer providing after-sales services for an electric product) can be a terminal under the control of a repairer who may provide an offline service, and can include a mobile terminal such as a smartphone or any similar computing devices. The repairer terminal 500 can receive information regarding a service from the service providing apparatus 100.

Figure 2:
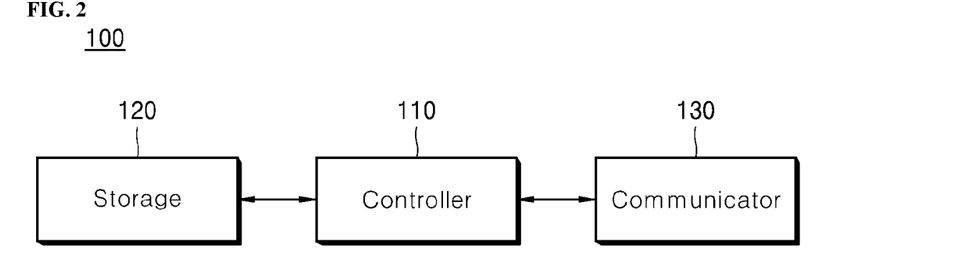
FIG. 2 is a block diagram of a service providing apparatus.

FIG. 2 is a block diagram of a service providing apparatus 100. The service providing apparatus 100 can include a controller 110, a communicator 130 and a storage 120.

The controller 110 can include a processing unit. The processing unit can include a central processing unit (CPU), a graphic processing unit (GPU), a microprocessor, an application-specific integrated circuit (ASIC), a field-programmable gate array (FPGA) or any other processing components, and can have a plurality of cores. The controller 110 can further include a volatile memory (e.g., RAM or any similar storing components) and/or a non-volatile memory (e.g., ROM, flash memory, or any similar storages).

The controller 110 can receive the product identification information and/or the manufacturing history matching the communicator identification information through the communicator 130 and store the received information in the storage 120.

The controller 110 can search for product identification information corresponding to the communicator identification information received by the communicator 130, and can transmit the found information through the communicator 130.

The controller 110 can confirm the state of the electronic product such as whether the electronic product is out of order or any similar status information regarding the electronic product as a result of analysis of the product state information received through the communicator 130, and can transmit results of the analysis through the communicator 130.

The storage 120 can include magnetic storage, optical storage and/or a flash memory. The storage 120 can match the communicator identification information and the product identification information under the control of the controller 110. In some implementations, the storage 120 can match the product state information and the communicator identification information and store the same. Further, the storage 120 can provide the stored information to the controller 110.

The communicator 130 can include a wire communication module and/or a wireless communication module. For example, the communicator 130 can include a modem, a network interface card (NIC), an integrated network interface, a wireless frequency transmitter/receiver, an infrared port and/or a universal serial bus (USB), or any similar communication devices. The communicator 130 can transmit data to and receive the same from other devices under the control of the controller 110. For example, the communicator 130 can receive the communicator identification information of the electronic product 300 from the user terminal 200, and can transmit, to the user terminal 200, the product identification information corresponding to the communicator identification information received from the user terminal 200. In some implementations, the communicator 130 can receive the product state information from the electronic product 300, and can transmit results of analysis of the product state information to the user terminal 200 and/or the repairer terminal 500. Further, the communicator 130 can receive the communicator identification information, the product identification information, and/or the manufacturing history from the manufacturing server 400. The product identification information and/or the manufacturing history can match the communicator identification information.

Figure 3:
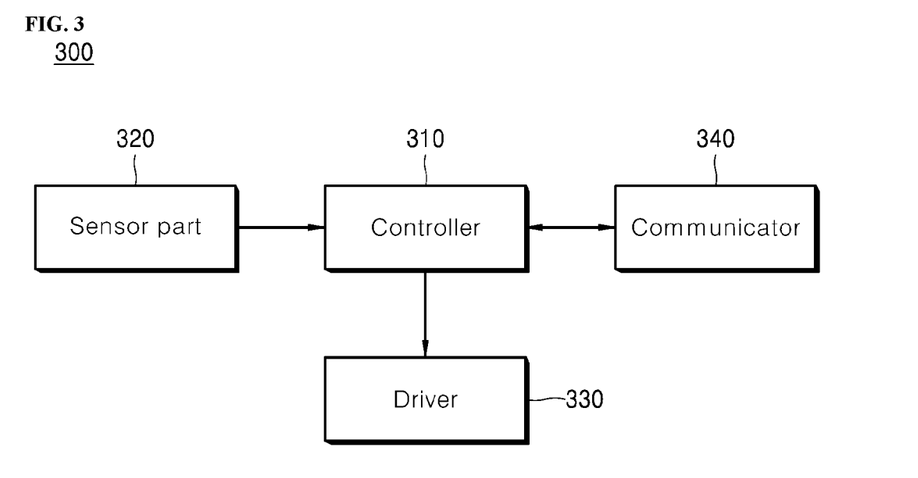
FIG. 3 is a block diagram of an electronic product that transmits information to the service providing apparatus.

FIG. 3 is a block diagram of an electronic product that transmits information to the service providing apparatus. The electronic product 300 can include a controller 310, a sensor part 320, a driver 330, and a communicator 340.

The controller 310 can control the driver 330 based on information received from the sensor part 320. In some implementations, the controller 310 can control the communicator 340 to allow the communicator to transmit the information received from the sensor part 320.

The sensor part 320 can sense information regarding conditions, environments, or any status information of each part of the electronic product 300, and can provide the sensed information to the controller 310. The configuration of the sensor part 320 may vary based on a type of the electronic product 300. For example, if a refrigerator is the electronic product 300, the sensor part 320 can include at least one of a refrigerator temperature sensor configured to sense a temperature of a refrigerator, a freezer temperature sensor configured to sense a temperature of a freezer, a door sensor configured to sense opening and closing of a door, a compressor sensor configured to sense information on driving of a compressor, an ice sensor configured to sense an amount of used ice and/or a state of ice, or a frost removal sensor configured to sense a frost removal cycle and state.

The driver 330 can include various devices required for an operation of the electronic product 300. For example, if the refrigerator is the electronic product 300, the driver 330 can include a compressor, a condenser, an expansion member, an evaporator for the refrigerator, an evaporator for the freezer, a refrigerator fan, and a freezer fan.

The communicator 340 can include various types of short-range wireless communication devices such as a WI-FI communication device, a NFC communication device, or any other communication devices. The communicator 340 can have unique identification information. For example, the communicator 340 including a WI-FI communication device can include MAC addresses allocated to the WI-FI communication device.

The communicator 340 can be included in any one of the plurality of assemblies constituting the electronic product 300. An identification label indicating the communicator identification information can be attached onto an outside of the assembly including the communicator 340. A QR code or a barcode can be displayed on the identification label.

Figure 4:
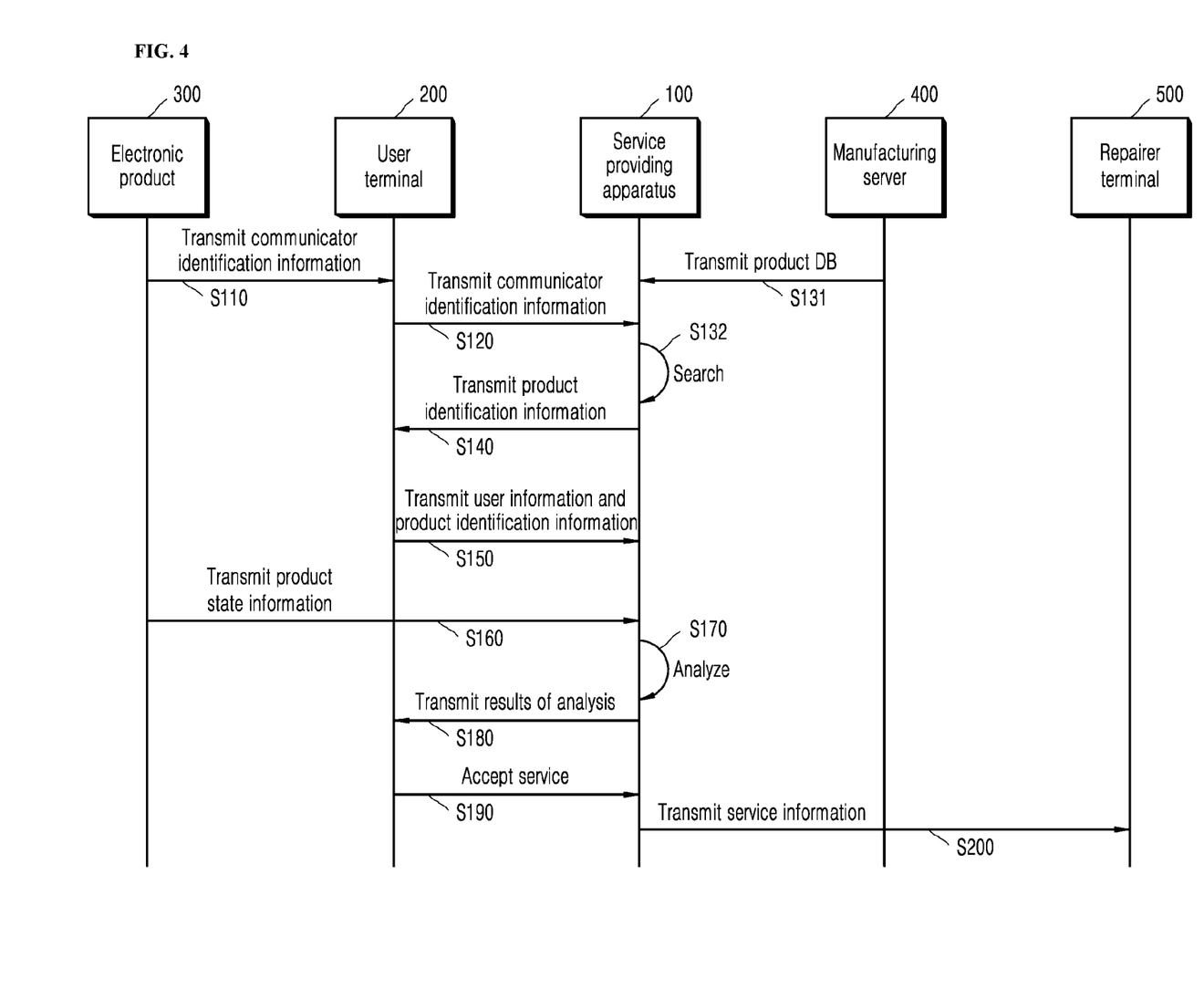
FIG. 4 is a diagram illustrating a view for describing a service providing method.

FIG. 4 is a diagram illustrating a view for describing a service providing method.

An electronic product 300 can transmit communicator identification information to a user terminal 200 (S110). To receive the communicator identification information, a predetermined application may be executed on the user terminal 200. In some implementations, for the electronic product 300 to transmit the communicator identification information, a communicator of the electronic product 300 may be turned on. The communicator can include a WI-FI communication device, and the communicator identification information can include MAC addresses of the WI-FI communication device.

The user terminal 200 can deliver the communicator identification information to a service providing apparatus 100 (S120). In some implementations, a predetermined application can be executed on the user terminal 200.

The service providing apparatus 100 can receive product database from a manufacturing server 400 (S131). The service providing apparatus 100 can receive product database on a regular basis. For example, the service providing apparatus 100 can receive product database from the manufacturing server 400 once a day. The product database can include communicator identification information that is identification information of a communicator included in the electronic product 300, and product identification information that is identification information of the electronic product 300. The product database can further include a manufacturing history of the electronic product 300. In some implementations, the product identification information and the manufacturing history can be matched and stored in the communicator identification information. The product identification information can include a model name of the electronic product 300 and/or a serial number of the electronic product 300. The manufacturing history can include at least one of a manufacturing date, a manufacturing location, a manufacturing line, or information associated with a manufacturing process of the electronic product 300.

The service providing apparatus 100 can search for the product identification information in relation to the electronic product 300 and/or the manufacturing history of the electronic product 300 based on the communicator identification information received from the user terminal 200 (S132). In some implementations, the service providing apparatus 100 can accurately confirm a model name and/or product identification information of an electronic product possessed by a user although the user does not directly confirm the model name or the product identification information of the product. Further, the service providing apparatus 100 can confirm a manufacturing history of the electronic product possessed by the user.

The service providing apparatus 100 can transmit the found product identification information to the user terminal 200 (S140).

The user terminal 200 can provide user information and the product identification information to the service providing apparatus 100 (S150). The user information can be identification information (e.g., a phone number) allocated to the user terminal 200, or identification information (e.g., a user ID) allocated to the user.

The service providing apparatus 100 can receive product state information that is information regarding operations, environments, or any similar information of the electronic product from the electronic product 300 (S160). In some implementations, the service providing apparatus 100 can receive the communicator identification information of the electronic product 300 together with the product state information. The product state information can include various types of information depending on a type of the electronic product. For example, if a refrigerator is the electronic product 300, the product state information can include one or more pieces of information regarding a refrigerator and/or freezer temperature, a time during which a door is opened and closed, information on driving of a compressor, a state of ice, and a frost removal cycle and state. The product state information can be transmitted to the service providing apparatus 100 periodically or sporadically.

The service providing apparatus 100 can analyze the received product state information (S170). For example, the service providing apparatus 100 can confirm whether the electronic product 300 is in a normal state or in an abnormal state and the like as a result of analysis of the product state information. In some implementations, the service providing apparatus 100 can analyze the product state information by additionally considering identification information (i.e., the product identification information) of the electronic product 300 corresponding to the communicator identification information and/or the manufacturing history of the electronic product 300 corresponding to the communicator identification information. Accordingly, the service providing apparatus 100 can confirm quality of each model of the electronic product 300. The service providing apparatus 100 can confirm quality of a new model even in an initial stage after the new model is introduced. Additionally, the service providing apparatus 100 can confirm information regarding a manufacturing date on which the electronic product was produced, a specific manufacturing line, or a manufacturing plant and/or errors of the electronic product 300 based on each model and the like. Further, the service providing apparatus 100 can predict a potential problem of the electronic product 300 being used by the user using information regarding previously confirmed errors and the like of the electronic product 300. Furthermore, the service providing apparatus 100 can confirm electronic-product-selling-region-based quality based on the user information (or information input by the user). The service providing apparatus 100 can also provide the user, a sales person, or an after-sales service provider of the electronic product with information necessary for the sales person or the service provider to take proper actions based on the confirmed quality. For example, the service providing apparatus 100 can provide information regarding required consumables for repairs with more accuracy, and provide information on a software update of a product manufactured on a specific date or can directly update software of an electronic product.

The service providing apparatus 100 can transmit results of the analysis to the user terminal 200 (S180).

In some implementations, the service providing apparatus 100 can also transmit the results of the analysis to the electronic product 300. The electronic product 300 can display information regarding a problem and any status information of the electronic product through a display of the electronic product 300.

The service providing apparatus 100 can also transmit the results of the analysis to the manufacturing server 400. The manufacturing server can solve a problem during manufacturing of the electronic product, using the results of the analysis.

The service providing apparatus 100 can receive a reply indicating acceptance of a service from the user terminal 200 (S190). For example, the user may request after-sales services based on the results of the analysis. In addition or alternatively, the results of the analysis can include a suggestion of a service needed, and the user may accept the suggestion through the user terminal 200.

The service providing apparatus 100 can provide information regarding services to the repairer terminal 500 (S200). The information regarding services can include at least one of user identification information, a repair date, a location, or details of a repair. The details of a repair can include the product identification information and/or information on parts needed for a repair.

Using the above method, the repairer can previously confirm a model name of an electronic product to be repaired and parts needed for the repair, thereby providing after-sales services more accurately and promptly.

In some implementations, steps 140 and 150 may be omitted. For example, the user terminal 200 can transmit the user information together with the communicator identification information to the service providing apparatus 100 in S120.

Figure 5:
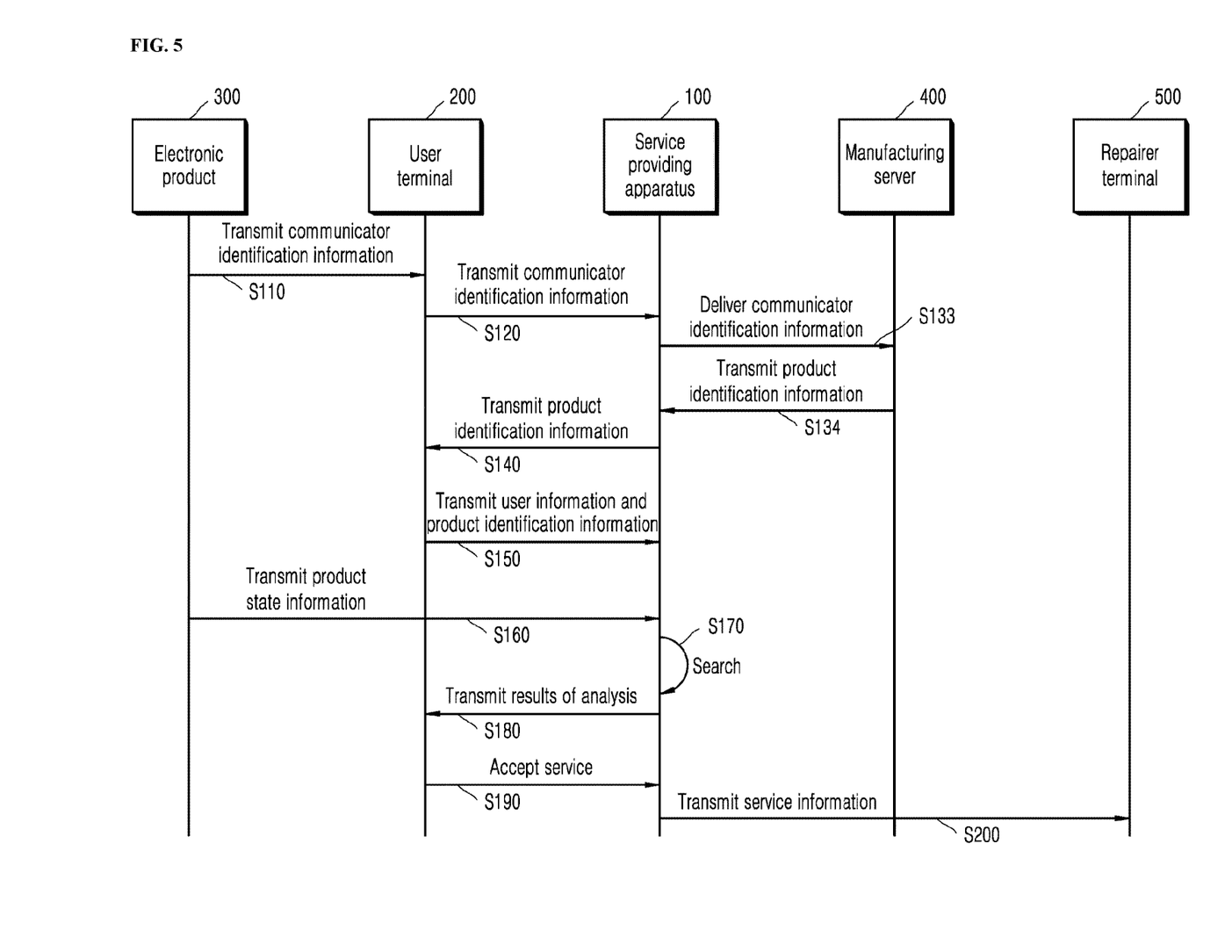
FIG. 5 is a diagram illustrating another view for describing a service providing method.

FIG. 5 is a diagram illustrating a view for describing another service providing method.

The service providing method described in FIG. 5 is similar to the service providing method described in FIG. 4 except that the service providing apparatus 100 receives communicator identification information, product identification information and a manufacturing history from the manufacturing server 400.

In some implementations, the service providing apparatus 100 can receive communicator identification information from the user terminal 200 (S120), and can deliver the communicator identification information received to the manufacturing server 400 (S133).

The service providing apparatus 100 can receive product identification information corresponding to the communicator identification information from the manufacturing server 400 (S134). In some implementations, the service providing apparatus 100 can additionally receive a manufacturing history corresponding to the communicator identification information from the manufacturing server 400.

What is claimed is:

1. A service providing apparatus, comprising:
a communicator configured to communicate with an electronic product, a user terminal, and a manufacturing server;
an electronic storage configured to store information received from the electronic product, the user terminal, and the manufacturing server;
and a controller configured to:
receive, from the electronic product by the communicator, a media access control (MAC) address of a WI-FI communication device included in the electronic product,
receive, from the manufacturing server by the communicator, a manufacturing history of the electronic product matching to the MAC address,
search, from the manufacturing server by the communicator, at least one of a serial number or a model name of the electronic product matched to the MAC address,
receive, from the electronic product by the communicator, product state information of the electronic product matched to the MAC address, and
analyze a state of the electronic product based on (i) the at least one of the serial number or the model name matched to the MAC address and (ii) the manufacturing history of the electronic product matched to the MAC address, the manufacturing history including at least one of a manufacturing date, a manufacturing location, a manufacturing line, or information associated with a manufacturing process of the electronic product,
determine the state of the electronic product based on (i) the at least one of the serial number or the model name matched to the MAC address and (ii) the manufacturing history of the electronic product matched to the MAC address,
generate service information for repair of the electronic product based on (i) the at least one of the serial number or the model name matched to the MAC address and (ii) the manufacturing history of the electronic product matched to the MAC address, and
transmit the service information to a repairer terminal,
wherein the controller is further configured to:
transmit a software update to the electronic product based on the determined state of the electronic product.

2. The service providing apparatus of claim 1, wherein the controller is configured to:
receive, from the user terminal through the communicator, the MAC address.

3. The service providing apparatus of claim 1, wherein the controller is configured to transmit, to the user terminal through the communicator, the state of the electronic product.

4. The service providing apparatus of claim 1, wherein the controller is configured to:
determine a type of service based on the state of the electronic product, and
transmit information regarding the service to the user terminal through the communicator.

5. The service providing apparatus of claim 1, wherein the controller is configured to transmit the state and the at least one of the serial number, the model name, or the manufacturing history of the electronic product to a terminal of a service provider to perform the service on the electronic product through the communicator.

6. The service providing apparatus of claim 1, wherein the service information includes at least one of user identification information, a repair date, a location, or details of a repair, the details of the repair including the at least one of the serial number or the model name or information regarding a part needed for the repair.

7. The service providing apparatus of claim 6, wherein the service information includes the user identification information.

8. The service providing apparatus of claim 6, wherein the service information includes the details of the repair including information regarding a part needed for the repair.

9. The service providing apparatus of claim 1, wherein the electronic product is a refrigerator.

10. The service providing apparatus of claim 1, wherein transmitting the service information comprises transmitting information regarding required consumables for repair of the electronic product matched to the MAC address.

11. A service providing method of a service providing apparatus comprising a communicator configured to communicate with an electronic product, a user terminal, and a manufacturing server, an electronic storage configured to store information from the electronic product, the user terminal, and the manufacturing server, and a controller, the method comprising:

receiving, from the electronic product by the communicator, a media access control (MAC) address of a WI-FI communication device included in the electronic product;

receiving, from the manufacturing server by the communicator, a manufacturing history of the electronic product matching to the MAC address;

searching, from the manufacturing server by the communicator, at least one of a serial number or a model name of the electronic product matched to the MAC address;

receiving, from the electronic product by the communicator, product state information of the electronic product matched to the MAC address;

analyzing a state of the electronic product based on (i) the at least one of the serial number or the model name matched to the MAC address and (ii) the manufacturing history of the electronic product matched to the MAC address, the manufacturing history including at least one of a manufacturing date, a manufacturing location, a manufacturing line, or information associated with a manufacturing process of the electronic product;

determining the state of the electronic product based on (i) the at least one of the serial number or the model name matched to the MAC address and (ii) the manufacturing history of the electronic product matched to the MAC address;

generating service information for repair of the electronic product based on (i) the at least one of the serial number or the model name matched to the MAC address and (ii) the manufacturing history of the electronic product matched to the MAC address;

transmitting the service information to a repairer terminal; and     transmitting a software update to the electronic product based on the determined state of the electronic product.

12. The service providing method of claim 11, further comprising:

receiving, from the user terminal, the MAC address.

13. The service providing method of claim 11, further comprising transmitting the state of the electronic product to the user terminal.

14. The service providing method of claim 11, further comprising:

determining a type of service based on the state of the electronic product; and     transmitting information regarding the service to the user terminal.

15. The service providing method of claim 11, further comprising transmitting the state and the at least one of the serial number, the model name, or the manufacturing history of the electronic product to a terminal of a service provider to perform the service on the electronic product.

16. The service providing method of claim 11, wherein the service information includes at least one of user identification information, a repair date, a location, or details of a repair, the details of the repair including the at least one of the serial number or the model name or information regarding a part needed for the repair.

17. The service providing method of claim 16, wherein the service information includes the user identification information.

18. The service providing method of claim 16, wherein the service information includes the details of the repair including information regarding a part needed for the repair.

19. The service providing method of claim 11, wherein transmitting the service information comprises transmitting information regarding required consumables for repair of the electronic product matched to the MAC address.

\* \* \* \* \*